(No Model.)
E. VERSTRAETE.
OPERATING DYNAMO ELECTRIC MACHINES IN MULTIPLE.
No. 556,788. Patented Mar. 24, 1896.
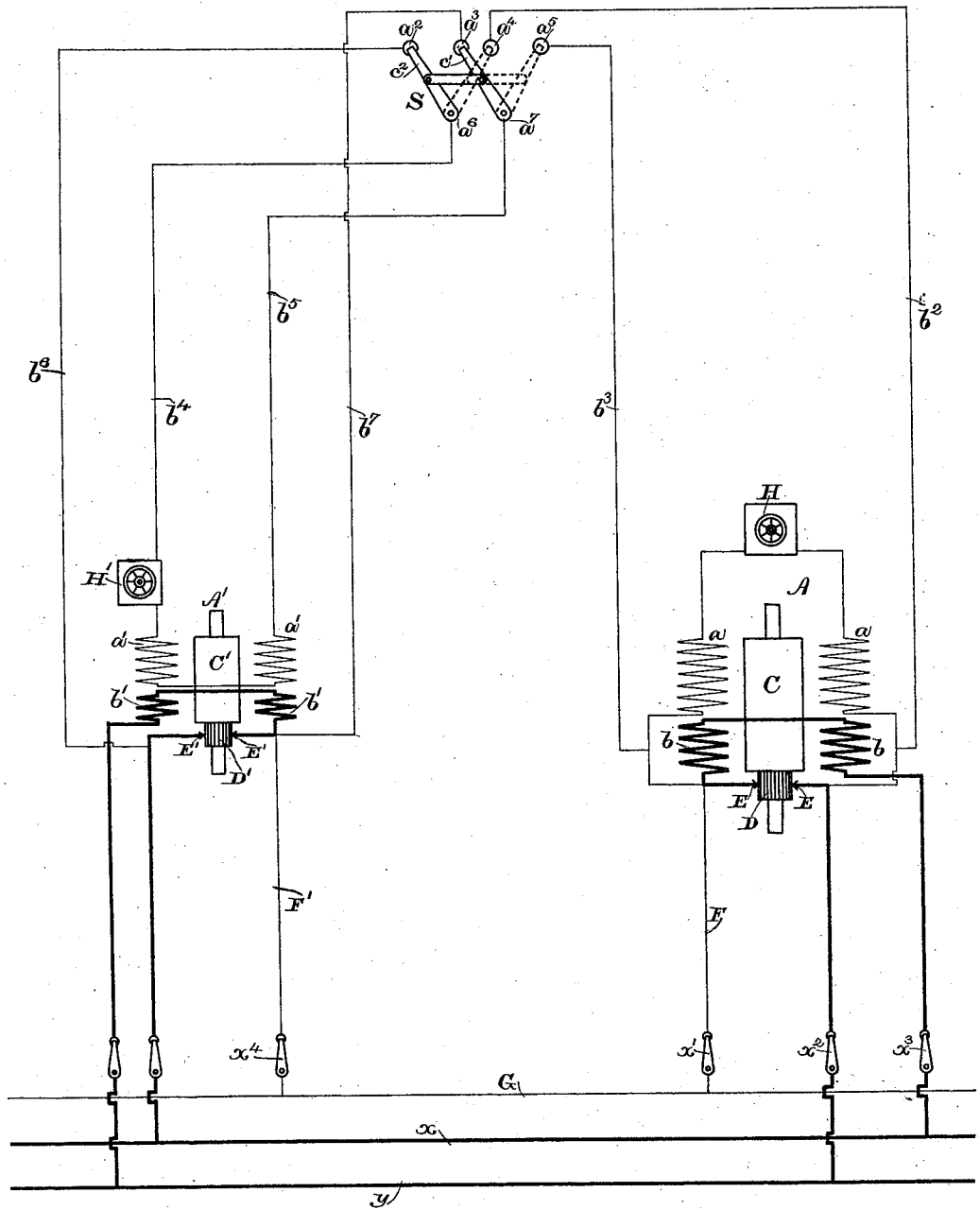
WITNESSES
W. H. Bentley
M. E. Hill
INVENTOR
Edmond Verstraete
by E. M. Bentley
Atty

UNITED STATES PATENT OFFICE.

EDMOND VERSTRAETE, OF ST. LOUIS, MISSOURI.

OPERATING DYNAMO-ELECTRIC MACHINES IN MULTIPLE.

SPECIFICATION forming part of Letters Patent No. 556,788, dated March 24, 1896.

Application filed September 1, 1894. Serial No. 521,894. (No model.)

*To all whom it may concern:*

Be it known that I, EDMOND VERSTRAETE, a citizen of the United States, residing at St. Louis, State of Missouri, have invented a certain new and useful Improvement in Operating Dynamo-Electric Machines in Multiple, of which the following is a specification.

My invention relates to an improvement in the method of operating dynamo-electric machines in multiple, and has for its object certain arrangements facilitating the coupling of machines of different sizes and capacity to supply the same circuit.

Heretofore "compound-wound" generators of substantially the same capacity have been thus arranged and a fair degree of regulation attained by connecting the series field-coils in multiple by means of a balance or compensating wire. Where a large number of generators are thus to be connected a busbar is provided, and the compensating-wire from the series field-coil of each machine is connected thereto, the multiple arrangement of all the series coils being thus maintained. With two or more generators of different capacity, however, this arrangement is not successful in producing a satisfactory operation, since it fails to properly distribute the load. The difficulties encountered are well known. If, for instance, the electromotive force of the smaller generators installed in multiple with larger ones should for any reason fall below the normal electromotive force of the main circuit, there is at once a weakening of the current passing through the series field-coil, and consequently a still further lowering of the electromotive force of the generator. This reciprocal action is continued until the main-line current overcomes that of the small generator, and it at once begins to run as a motor. While complete reversal of the small generator may be prevented by connecting all the series fields in multiple by means of the balance or compensating connection before described, the series coil of the small machine is liable to receive too great or too small a share of current, and hence not do its proper share of the work.

I have discovered that by establishing certain connections between the field-coils of generators of different sizes coupled in multiple to the same circuit the difficulty heretofore met is practically obviated, and the smaller generators may be run in connection with generators of greater capacity to supply the same circuit in multiple without any disturbing results and with proper distribution of the load.

In making comparison between large and small generators, or generators of different capacity, it is of course understood that all such generators of whatever capacity are normally designed to supply current of standard and uniform tension.

In the accompanying drawing is shown a diagrammatic illustration of a large and small generator coupled in multiple to the same circuit and connected according to the method I have devised. But two generators are shown for the sake of simplicity, but any number could be thus arranged.

The large generator A is compound-wound and has the shunt field-coils $a\ a$ and the series field-coils $b\ b$.

C is the armature provided with a commutator D. The brushes E E are connected to the respective terminals of the circuit X Y, which the generator A supplies. The smaller generator A', with shunt field-coils $a'\ a'$, series field-coils $b'\ b'$, armature C', commutator D', brushes E' E', likewise supplies the same circuit X Y, being arranged in multiple with A. The field-coils of the two generators are also connected in multiple by means of the balance-wires F and F' leading to the bus-bar G. Included in the shunt field-circuit of each generator, respectively, are the rheostats H and H' for regulating the tension of the current.

S is a switchboard provided with the terminals $a^2$, $a^3$, $a^4$, $a^5$, $a^6$, and $a^7$. The shunt field-coils of generator A are connected to the terminals $a^4$ and $a^5$ by conductors $b^2$ and $b^3$, while the shunt field-coils of generator A terminate at $a^6$ and $a^7$ by means of the conductors $b^4$ and $b^5$. Additional conductors $b^6$ and $b^7$ connect the terminals $a^2$ and $a^3$ to the series field-coils of generator A' on opposite sides of the commutator. The switchboard S is provided with a switch of any desired form for making the necessary connections between terminals. There is shown in the drawing a simple double-pole switch of the reversing type, the arms $c'$ and $c^2$ being made of conducting material, but well insulated from each other. The arms $c'$ and $c^2$ are respectively pivoted to the terminals $a^7$ and $a^6$, with which they are in electrical connection.

When it is desired to operate the two generators in conjunction to supply the same circuit X and Y, the arms $c'$ and $c^2$ are moved over switchboard S to the position indicated by the dotted lines connecting terminal $a^4$ with $a^6$ and terminal $a^5$ with $a^7$. The shunt-field of the small generator A' is therefore connected in multiple with the shunt-field of the large generator A. It is hence clear that whatever conditions of the main circuit affect the current traversing the shunt field-coils of the larger generator the same result is obtained in the shunt field-coils of the smaller generator, and as long as the two generators thus connected are operated together to supply current to the same circuit the shunt field-coil of the smaller generator receives its current from the terminals of the shunt field-coil of the larger generator. The series field-coil of the respective generators are at the same time retained in multiple arrangement by means of the balance-wires F and F'.

Should it be desired to supply the main circuit with the smaller generator alone or in connection with other small generators, it is merely necessary to move the switch to the left in the position shown in solid lines. Terminal $a^2$ is thus connected to $a^6$ and terminal $a^3$ to $a^7$. The shunt field-coils of the smaller generator are thereby brought into their proper relation to the armature, the current following the conductor $b^7$ from one brush to terminal $a^3$, switch-arm, terminal $a^7$, conductor $b^5$, shunt field-coil $a'$, rheostat H', conductor $b^4$, terminal $a^6$, switch-arm, terminal $a^2$, and conductor $d^6$ to the other brush. It is of course understood that when the smaller generator alone is supplying current to the main circuit the larger generator is entirely disconnected from line by the switches $X^1$, $X^2$, and $X^3$. The balance-wire F' is also disconnected from the bus-bar G by switch $X^4$.

When it is desired to use the larger generator alone, the switch remains in the same position as when the smaller generator is operated singly. The terminals $a^4$ and $a^5$ being well insulated, the circuit of $b^3$ and $b^2$ is open at those points. The shunt-coils of the larger generator are therefore in proper relation to the armature C and disconnected from the shunt-coils of generator A'. The result of maintaining this arrangement of the two generators when operating them in multiple is to establish an even distribution of the load and to assist the compensating action of the series field-coils in multiple.

What I claim as new, and desire to secure by Letters Patent, is—

1. The combination with a generator having series field-coils and field-coils in shunt relation to the armature, of another generator supplying the same circuit in multiple having a set of shunt field-coils energized by current taken from opposite sides of the armature of the first generator.

2. The combination with two generators connected to the same circuit in multiple and having series field-coils respectively connected in multiple, of a set of shunt field-coils on each generator, one of which is adapted to be connected in multiple with the armature of the other.

3. The combination with two generators connected to the same circuit in multiple and having series field-coils respectively connected in multiple, of a set of shunt field-coils on each generator connected in multiple, and supplied in multiple with current taken from opposite sides of the armature of one generator.

In witness whereof I have hereunto set my hand this 22d day of August, 1894.

EDMOND VERSTRAETE.

Witnesses:
H. HENSLER,
W. J. LEWIS.